United States Patent

Yun

Patent Number: 5,905,541
Date of Patent: May 18, 1999

[54] TELEVISION PICTURE IMAGE PROCESSING APPARATUS

[75] Inventor: Hyung Sik Yun, Seoul, Rep. of Korea

[73] Assignee: LG Semicon Co., Ltd., Choongcheongbuk-Do, Rep. of Korea

[21] Appl. No.: 08/725,984

[22] Filed: Oct. 4, 1996

[30] Foreign Application Priority Data

Oct. 6, 1995 [KR] Rep. of Korea ..................... 95/34269

[51] Int. Cl.⁶ ............................. H04N 3/22; H04N 3/26; H04N 9/28
[52] U.S. Cl. ......................... 348/687; 348/806; 348/807; 348/745; 348/688
[58] Field of Search ................................. 348/806, 807, 348/745, 746, 747, 687, 688, 678; 315/368.11, 368.12, 368.18, 368.19, 368.21, 368.24, 386, 382.1, 383, 370, 371

[56] References Cited

U.S. PATENT DOCUMENTS

| | | | |
|---|---|---|---|
| 4,425,576 | 1/1984 | Hosoya | 348/506 |
| 4,628,362 | 12/1986 | Waehner | 348/687 |
| 4,864,400 | 9/1989 | Kumada et al. | 348/525 |
| 4,868,668 | 9/1989 | Tavernetti | 348/687 |
| 4,982,287 | 1/1991 | Layoni | 348/687 |
| 5,146,142 | 9/1992 | Van Toi | 348/806 |
| 5,592,240 | 1/1997 | Sakamoto et al. | 348/806 |

*Primary Examiner*—Nathan J. Flynn
*Assistant Examiner*—Vivek Srivastava

[57] ABSTRACT

A television picture image processing apparatus includes a horizontal edge gate pulse generator, a vertical edge gate pulse generator, an AND combiner for ANDing horizontal and vertical edge gate pulses applied thereto respectively from the horizontal and the vertical edge gate pulse generators, a sawtooth pulse generator, an amplifier for controlling the gain of sawtooth pulses from the sawtooth pulse generator in accordance with an external DC voltage, and a luminance processor. The apparatus prevents picture quality of a television set from being degraded due to a poor contrast and brightness occurring in each corner of a television picture screen.

10 Claims, 3 Drawing Sheets

FIG. 3
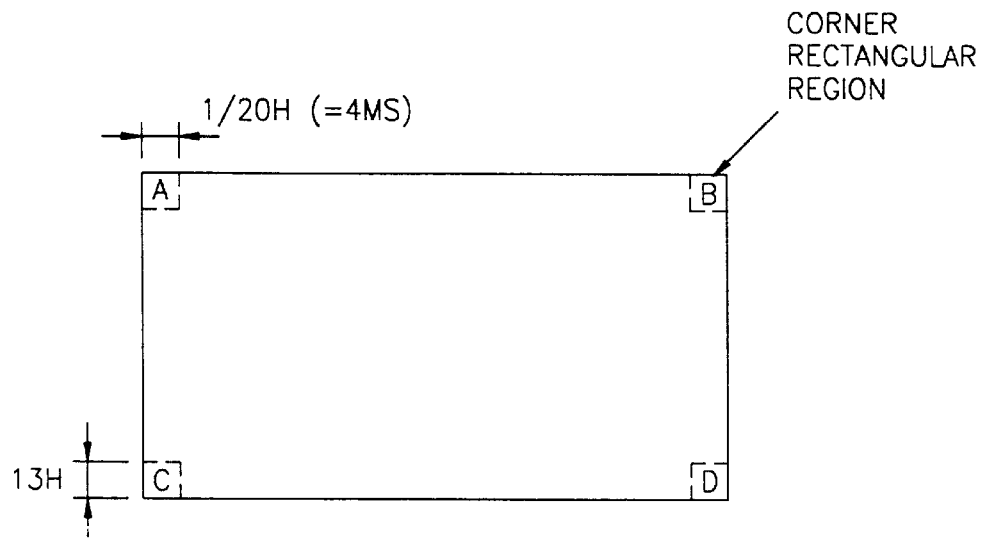
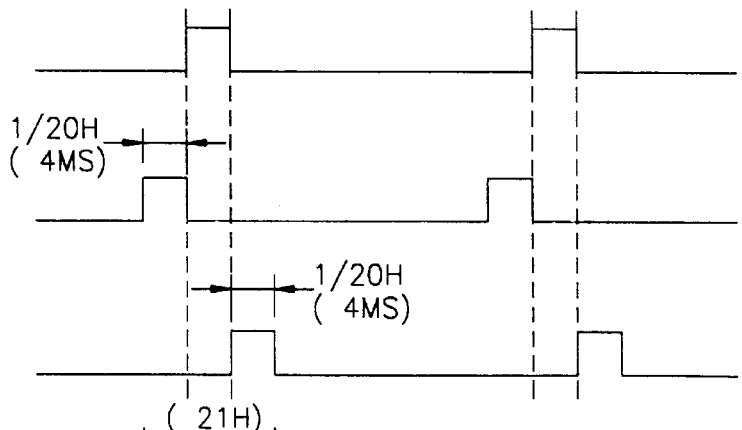
FIG.4A
FIG.4B
FIG.4C
FIG.4D
FIG.4E
FIG.4F

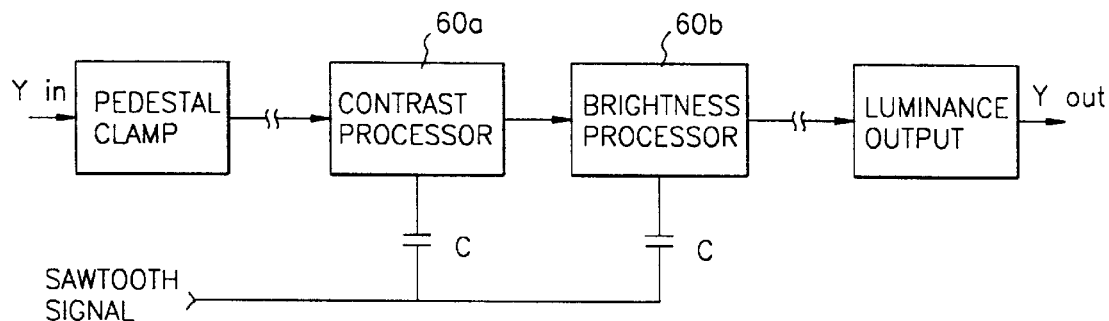
FIG. 5
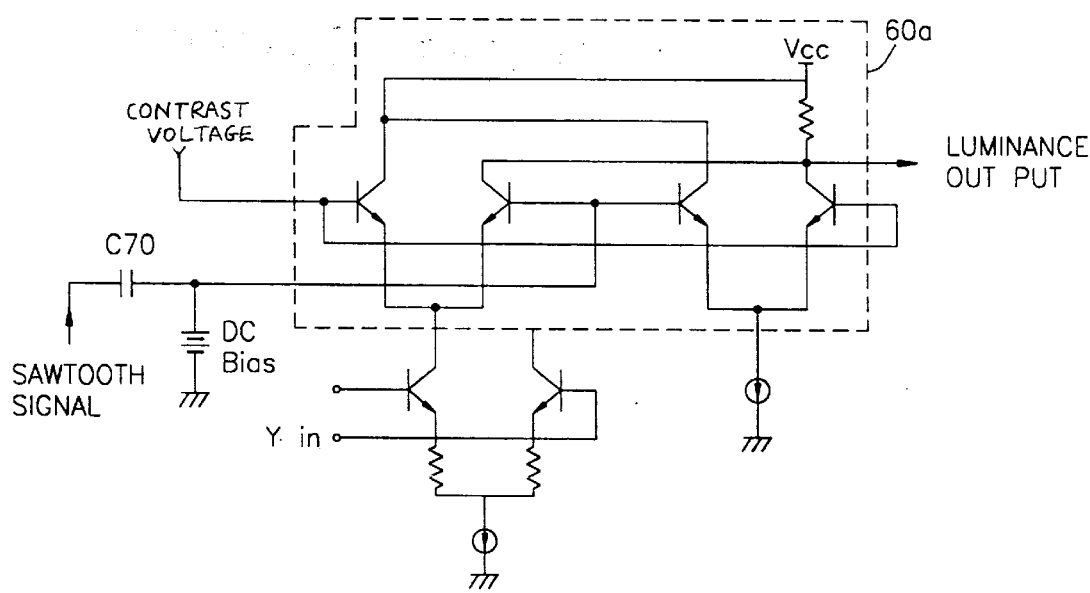
FIG. 6
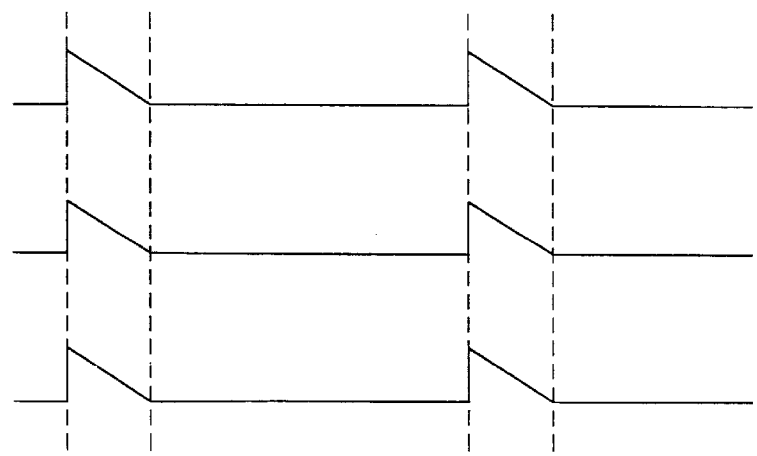
FIG. 7A
FIG. 7B
FIG. 7C

TELEVISION PICTURE IMAGE PROCESSING APPARATUS

BACKGROUND OF THE INVENTION

1. Field of the Invention

The present invention relates to a picture image processing apparatus, and more particularly to a television picture image processing apparatus capable of preventing a picture quality of a television set from being degraded due to a poor contrast and brightness occurring in each corner of a television picture screen.

2. Description of the Prior Art

Conventionally, to enhance the picture quality of a TV set, a picture analysis and compensation technique has been employed, wherein chromatic aberration of an image-processed picture is detected in a facial or non-facial tone detector, for thereby deciding whether or not a flesh color is generated.

The compensation value of the detected color tone is selected in a normalizing circuit after the value of the color tone passes through a facial tone combiner for a facial color tone, and a non-facial combiner for a non-facial color tone.

The selected compensation value combined with a color offset value is fed back to an image processor for color compensation.

After detecting a ceiling or bottom value of Y-output, the compensated value may be fed back to a fuzzy logic processor, so that the picture quality can be enhanced by compensating the contrast or brightness thereof.

In the case of a color compensation, a flesh color is allocated in a region such as a R-Y or B-Y domain, and each value for the colors in the region is decided accordingly.

With regard to a contrast or brightness compensation, the value thereof is decided depending on a fuzzy logic operation.

However, the above-described conventional picture quality compensation has a disadvantage in that as a television picture screen increases in size, the picture quality is degraded in each corner of the TV picture screen.

SUMMARY OF THE INVENTION

Accordingly, it is an object of the present invention to provide a television picture image processing apparatus capable of enhancing a general picture quality by compensating the contrast or brightness in each corner of the picture on a TV screen.

To achieve the above-described and other objects, the television picture image processing apparatus includes a horizontal edge gate pulse generator for generating a horizontal edge gate pulse for thereby detecting a contrast and a brightness in each corner area of a picture screen, a vertical edge gate pulse generator for generating a vertical edge gate pulse for thereby detecting a contrast and a brightness in each corner area of a picture screen, an AND combiner for ANDing the pulse applied thereto from each of the horizontal and the vertical edge gate pulse generators, a sawtooth pulse generator for converting the gate pulse applied thereto from the AND combiner into a sawtooth signal in accordance with a charge and a discharge by a resistance and a condenser, an amplifier for controlling and outputting therefrom the gain of the sawtooth converted thereinto in the sawtooth pulse generator in accordance with an external DC voltage, and a luminance processor for compensating picture quality in each corner of a television picture screen in accordance with a sawtooth pulse which gain is controlled by the amplifier.

BRIEF DESCRIPTION OF THE DRAWINGS

FIG. 3 is a composition view of a TV picture according to the present invention;

FIGS. 4A through 4F are timing diagrams for a horizontal blanking view pulse, a vertical blanking pulse and an edge gate pulse;

FIG. 5 is a schematic block diagram showing the details of a luminance processor of FIG. 1;

FIG. 6 is a schematic circuit diagram of a contrast processor of FIG. 5; and

FIGS. 7A through 7C are waveform diagrams showing picture quality compensations according to the present invention.

DETAILED DESCRIPTION OF THE PRESENT INVENTION

In general, assuming that the area of each rectangular corner region on a television picture screen accounts for approximately one tenth of the whole picture screen area, each corner region measures $\frac{1}{20}$ H($\approx$4 $\mu$sec) in width by $\frac{1}{20} \times 262.5$ H($\approx$13 H) in height, as shown in FIG. 3.

To compensate the picture quality in each corner region of the TV picture, horizontal and vertical gate pulses for regulating the corner portions generated by a gate pulse generator according to the present invention. Also, the pulses generated by the gate pulse generator are positioned before and after the horizontal and vertical blanking pulses of a picture image signal, because each of the blanking pulses serves to mute the picture image signal including a luminance and a color signal so as to eliminate the noise on the picture screen during a certain time in which the horizontally and vertically scanned electronic wave returns to its initial location.

That is, for compensating the right side corner regions B, D in FIG. 3, a horizontal back edge gate pulse as shown in FIG. 4B is generated for $\frac{1}{20}$ H the generation of before the horizontal blanking pulse as shown in FIG. 4A, and accordingly the horizontal back edge gate pulse compensates the corner regions B and D in FIG. 3.

As shown in FIG. 4C, a horizontal front edge gate pulse having a pulse width of 4 MS is generated after the generation of the horizontal blanking pulse, and compensates the corner regions A and C in FIG. 3.

Also, when a vertical blanking pulse as shown in FIG. 4D is generated, and a vertical back edge gate pulse and a vertical front edge gate pulse as shown in FIGS. 4E and 4F, respectively, are generated the corner regions A–D in FIG. 3 are compensated accordingly.

The operation for compensating the corner regions will now be described.

Figure 1:
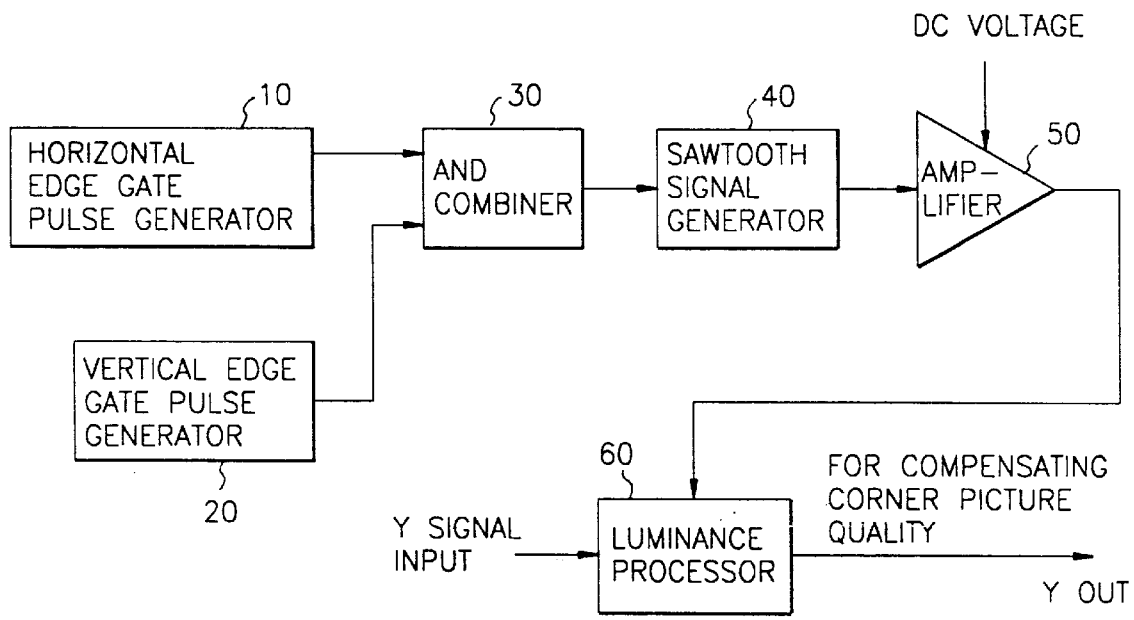
FIG. 1 is a schematic block diagram of a television picture image processing apparatus in accordance with the present invention.

As shown in FIG. 1, horizontal edge gate pulses and vertical edge gate pulses are respectively generated by a horizontal edge gate pulse generator 10 and a vertical edge gate pulse generator 20.

Figure 2:
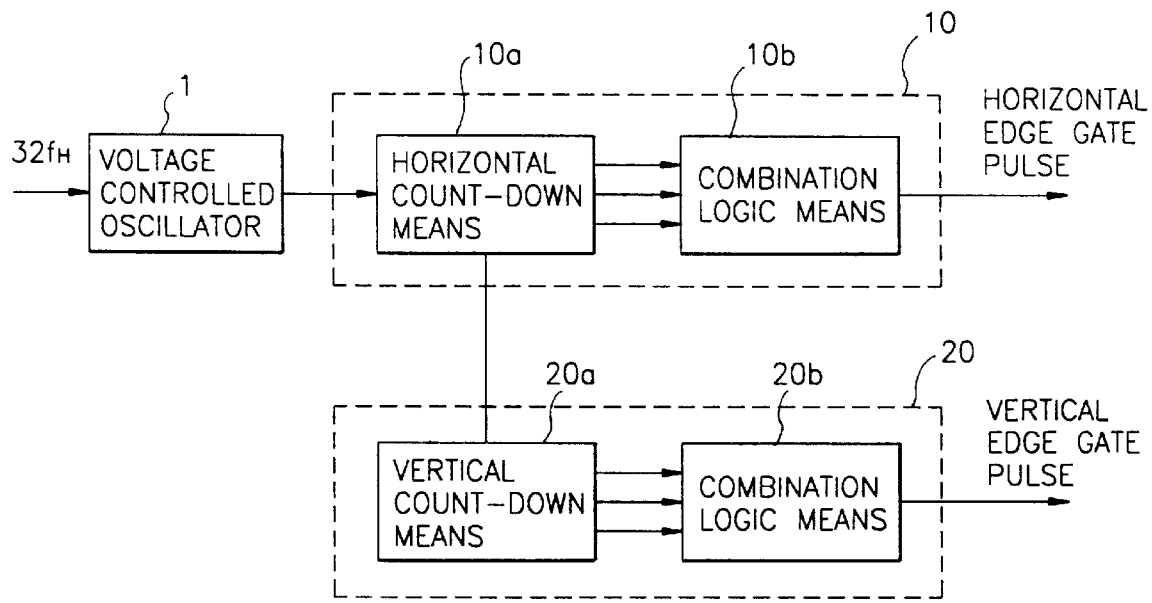
FIG. 2 is a schematic block diagram showing the details of horizontal and vertical edge gate pulse generators of FIG. 1.

Specifically, as shown in FIG. 2, a signal having frequency $32f_H$ is applied to a voltage controlled oscillator 1 which in turn generates a clock signal which is counted down to a certain value in a horizontal count-down circuit 10a of the horizontal edge gate pulse generator 10, and the counted-down pulse is applied to the vertical edge gate pulse generator 20 and at the same time to a combination logic circuit 10b which in turn generates a horizontal edge gate pulse combined with the counted-down value output from the horizontal count-down circuit 10a. The horizontal counted-down values correspond to the horizontal positions of the comer regions of the picture screen.

In the horizontal gate edge pulse generator 10, the count-down value output from the horizontal count-down circuit 10a is applied to the combination logic citcuit 10b to generate a horizontal edge gate pulse. Also, in the vertical edge gate pulse generator 20, the horizontal counted-down value output from the horizontal count-down circuit 10a is vertically counted down to a certain value by a vertical count-down circuit 20a. The vertical counted-down values correspond to the vertical positions of the comer regions of the picture screen. As a result, the counted-down value output from the vertical count-down circuit 20a is applied to a combination logic circuit 20b which accordingly generates a vertical edge gate pulse. The generated horizontal edge gate pulse and vertical edge gate pulse are applied to an AND combiner 30, as shown in FIG. 1.

The AND combiner 30 generates a final gate pulse by ANDing the horizontal edge gate pulse and the vertical edge gate pulse, and the final gate pulse is applied to a sawtooth generator 40 to generate a sawtooth pulse in accordance with the charging and discharging through a resistance of a condenser. The resultant sawtooth pulse is applied to an amplifier 50.

That is, in this example, to enable a picture quality compensation in each corner of the TV picture, the final gate pulse corresponding to each comer of a TV picture screen is converted into a sawtooth pulse.

In the amplifier 50, the final gate pulse is gain-controlled in accordance with an externally applied DC voltage, and adjusted to a size equivalent to a sawtooth pulse. Then the adjusted signal from the amplifier 50 is sent to a luminance processor 60, by which a luminance signal is processed with a constant bias in the regions of a TV picture excluding the areas included within the corner regions. However, as shown in FIG. 5, in each part of the luminance signal corresponding to a corner area of the TV picture, the sawtooth signal from the amplifier 50 is coupled through a capacitor C to a contrast processor 60a and a brightness processor 60b, respectively, whereby the contrast gain and the brightness is controlled in accordance with the distorted standard bias voltage. The luminance signal is received and limited to a predetermined level (e.g., D.C. level) by a pedestal clamp 60c.

As shown in FIG. 7A, the sawtooth signal level remains low in non-corner regions of the television picture, so that it is not affected by an external DC bias voltage. However, when the high level sawtooth signal corresponding to corner regions of the TV picture is applied through the capacitor C to the contrast processor 60a for compensating each corner region of the picture, as shown in FIG. 6, it interacts with a DC bias voltage at a node N1 as shown in FIG. 7B, whereby the gain of the luminance signal is controlled by a pulse as shown in FIG. 7C. That is, as shown in FIG. 7C, the increased sawtooth signal raises the DC voltage in the corner regions (e.g., A, B, C and D in FIG. 3), thereby increasing the gain to compensate for the picture quality degration in corner regions of a TV screen.

FIG. 6 is provided to describe an amplifier for controlling an amplifier gain by a DC voltage, wherein the higher voltage is applied to the base of the transistor, the more current is induced thereby raising the gain. Therefore, the sawtooth signal of the DC bias unit loaded therein raises the DC voltage in the corner regions, thereby resulting in a gain increase. As a result, the contrast in the corner regions of the picture screen is controlled. Similarly, the brightness processor 60b controls the brightness of the luminance signal output from the contrast processor 60a.

Further, the previously described operation is identically performed in the brightness processor 60b for thereby compensating the brightness in each corner region of the TV picture.

As described above, the television picture image processing apparatus in accordance with the present invention serves to enhance a general picture quality by compensating the loss of contrast and brightness in each corner region of a large television picture screen.

What is claimed is:

1. An image processing apparatus, comprising:
   a horizontal edge gate pulse generator for generating a plurality of horizontal edge gate pulses corresponding to corner regions of a picture screen;
   a vertical edge gate pulse generator for generating a plurality of vertical edge gate pulses based on the plurality of horizontal edge pulses;
   a combiner for combining the horizontal edge gate pulses and vertical edge gate pulses from the horizontal and the vertical edge gate pulse generators to generate a combined gate pulse signal;
   a sawtooth pulse generator for converting the combined gate pulse signal from the combiner into a sawtooth pulse signal corresponding to said corner regions of the picture screen;
   an amplifier for controlling a gain of the sawtooth pulse signal from the sawtooth pulse generator in accordance with an external DC voltage; and
   a luminance processor for compensating a picture quality in each of said comer regions of the picture screen in accordance with the sawtooth pulse signal output from the amplifier.

2. The apparatus of claim 1, wherein the horizontal edge gate pulse generator includes;
   a voltage controlled oscillator for generating a plurality of pulse signals have a predetermined frequency,
   a horizontal count-down unit for counting down the pulse signals output from the voltage controlled oscillator to reach a predetermined horizontal count-down value, and
   a combination logic unit for producing the horizontal edge gate pulses in accordance with the horizontal count-down value.

3. The apparatus of claim 2, wherein the vertical edge gate pulse generator includes:
   a vertical count-down unit for vertically counting down a pulse signal output from the horizontal count-down unit to reach a predetermined vertical count-down value, and
   a combination logic unit for producing the vertical edge gate pulses in accordance with the vertical count-down value.

4. The apparatus of claim 1, wherein the luminance processor receives a luminance signal and increases a gain of the luminance signal in accordance with the sawtooth pulse signal.

5. The apparatus of claim 4, wherein the sawtooth pulse signal includes sawtooth pulses, each corresponding to one of said corner regions of the picture screen.

6. The apparatus of claim 1, wherein the luminance processor includes a DC voltage bias unit which increases a gain of a luminance signal input thereto according to the sawtooth pulse signal output from the amplifier.

7. The apparatus of claim 1, wherein the plurality of horizontal and vertical edge gate pulses are rectangular pulses, and the combiner combines these rectangular pulses.

8. The apparatus of claim 1, wherein the plurality of horizontal edge gate pulses generated by the horizontal edge gate pulse generator correspond to horizontal positions of said corner regions of the picture screen.

9. The apparatus of claim 8, wherein the plurality of vertical edge gate pulses generated by the vertical edge gate pulse generator correspond to vertical positions of said corner regions of the picture screen.

10. The apparatus of claim 1, wherein the combiner generates the combined gate pulse signal which correspond to said corner regions of the picture screen.

* * * * *